Feb. 4, 1969    A. R. HOLLIS    3,425,734
RETRIEVAL AND WALKING AID
Filed March 1, 1967
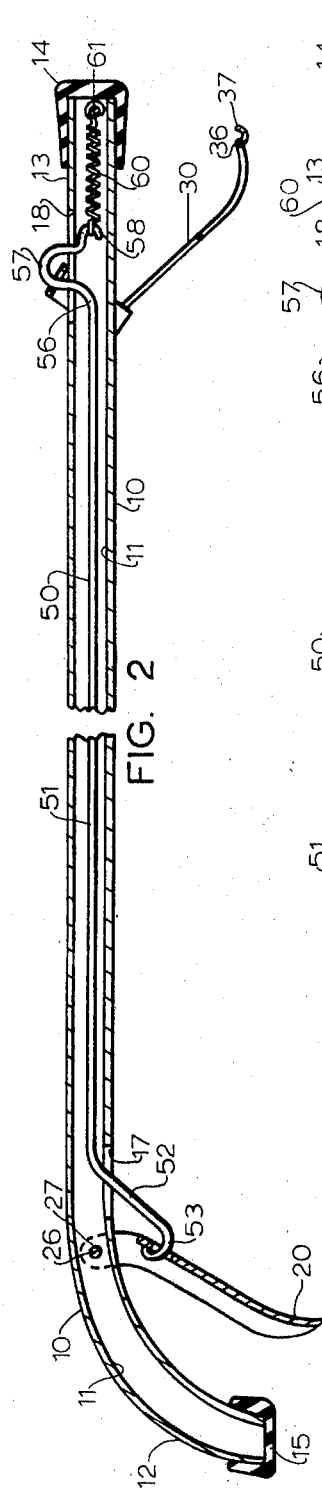
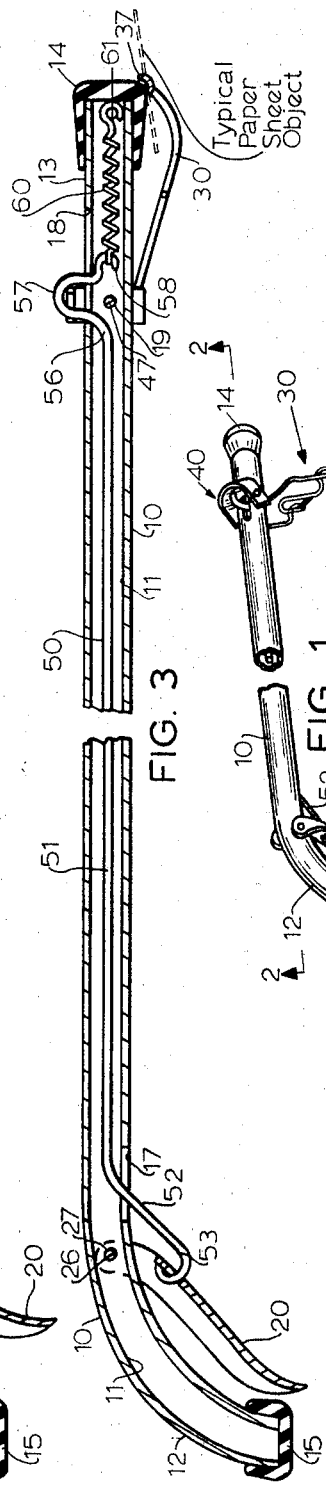
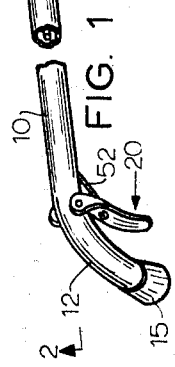
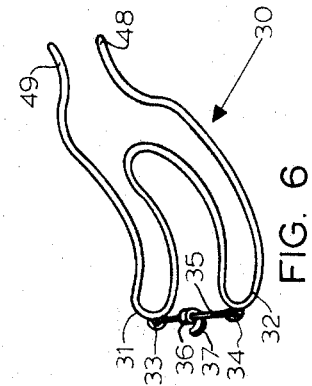
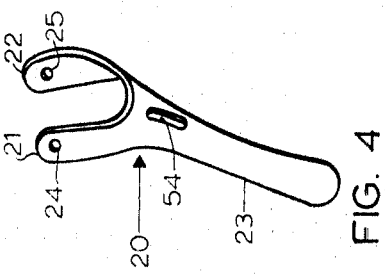
INVENTOR.
Alton R. Hollis
BY
ATTORNEYS

United States Patent Office 3,425,734
Patented Feb. 4, 1969

3,425,734
RETRIEVAL AND WALKING AID
Alton R. Hollis, Rte. 1, Hillsborough, N.C. 27278
Filed Mar. 1, 1967, Ser. No. 619,705
U.S. Cl. 294—19                              7 Claims
Int. Cl. A47f 13/06; A45b 3/00

ABSTRACT OF THE DISCLOSURE

An elongated tubular structure which has one end adapted to engage the ground upon being held by an operator is provided with a handle and trigger portion at the upper end and a pivotally mounted grasping element at the ground-engaging end which is connected by means to the trigger such that upon the actuation of the trigger, the grasping element closes toward the adjacent portion of the tubular body to trap a subject work object. A tension spring is mounted within the hollow portions of the tubular member and is in communication with the trigger and grasping element to return the trigger and grasping element to a normally static position after the actuation of the same.

BACKGROUND OF THE INVENTION

Field of the invention

This invention is concerned with improvements in the construction of walking sticks and, primarily, with the combination of a walking stick and a means for retrieving objects on the ground which may be large, such as ears of corn, or small like bits of paper. The grasping means is connected to the trigger and upon the actuation of the trigger, the grasping means pivots about a point and traps an object between itself and the tubular member. The grasping means also includes on the end engaging the tubular member a flexible member having a frictional surface which engages and conforms around the periphery of the tubular member. Such devices are sometimes classified in Class 294 (Handling, Hand and Hoistline Implements), sub-class 19 (Poles), sub-class 22 (Store Goods) and sub-class 23 (Compound Tools).

Description of the prior art

The devices of the prior art generally include an elongated shaft and a grasping element mounted on one end thereof. The grasping element may include an attachment such as a string, cord or the like which, when pulled, is adapted to pivot the grasping element against the pole or against a corresponding grasping element which may work in unison therewith. The devices of this type have the disadvantage of having the grasping means actuator mounted externally of the elongated pole or shaft and thus the actuator is apt to become tangled in foreign objects. Further, these devices are not adapted to retrieve small objects such as paper which may litter the ground and, alternatively, to retrieve larger objects such as ears of corn, pine cones, potatoes or the like. Also, these devices are not adapted to be used as a walking stick when the same is not being used for a retrieval means.

Patent 3,110,963 to Lewandowski discloses an aquarium plant cleaner and is primarily concerned with the cutting of such plants; however, it can be seen that grasping devices could be substituted for the cutting blades to form a retrieval device which is common in the prior art. The aquarium plant cleaner is comprised of a pair of cooperating cutting blades, an elongated handle portion and a trigger which resides in the handle portion and which is connected to the blades. The trigger also includes a spring which is mounted in the handle portion and which is adapted to return the trigger and the blades to their normal static position upon the release of the trigger. However, the connecting rod of Lewandowski is mounted externally of the elongated handle portion; also, in no way could the composite apparatus be used as a walking stick. Further, nothing is taught in the prior art which would adapt a device of this type to retrieve small bits of paper or the like while alternatively being adapted to pick up and transport larger objects.

SUMMARY OF THE INVENTION

The present invention is primarily directed to a retrieval device and walking stick which includes an elongated tubular body member, a handle being formed from one end of the tubular body member, a trigger pivotally mounted on the tubular body member adjacent the handle, a grasping arm pivotally mounted on the tubular body member at its opposite end, a connecting rod which links the grasping arm with the trigger such that upon the actuation of the trigger, the grasping arm moves toward that end of the tubular member, and a spring means which is adapted to return the grasping arm and the trigger to a normally open and static position. The ground-engaging end of the tubular member is provided with a rubber cushion which acts to soften the impact between the tubular member and the ground or the like and also serves to secure certain objects between the tubular member and the grasping arm. The grasping arm is shaped substantially like a W and includes two lobes which have the closed extremities thereof connected by a flexible membrane such as a thick rubber band or the like. Thus, when grasping small objects such as bits of paper, the rubber band forces the paper against the rubber cushion and prevents the same from escaping the grasp.

Therefore, an object of this invention is to provide a walking stick which is also adapted to retrieve large and small objects from the ground or other surface.

Another object of this invention is to provide a combination walking stick and retrieval device with a grasping arm which is normally not an obstruction when the device is used as a walking stick and which may be pivoted into contact with the ground-engaging end of the walking stick to grasp certain objects.

A further object of this invention is to provide a retrieval dvice which has a trigger mounted on one end of a tubular member and a grasping arm mounted on the other end with a linkage rod which connects the grasping arm and the trigger but resides inside the tubular member.

These and other objects of this invention will become apparent when the following detailed description is read in conjunction with the drawings.

DESCRIPTION OF THE DRAWINGS

FIGURE 1 is a pictorial view of the apparatus showing the various elements which comprise the same;

FIGURE 2 is an enlarged section view of the device taken along line 2—2 of FIGURE 1 showing the trigger and grasping arm in a normally open or static position and the linkage rod for connecting the trigger and grasping arm;

FIGURE 3 is a section view of FIGURE 2 showing the same in a closed or grasping position;

FIGURE 4 is a pictorial view of the trigger;

FIGURE 5 is a pictorial view of the collar for connecting the grasping arm to the elongated tubular member; and FIGURE 6 is a pictorial view of the grasping arm showing the flexible member for securing objects to the tubular member.

DETAILED DESCRIPTION OF THE PREFERRED EMBODIMENT

Tubular member 10 includes a passageway 11 which extends substantially the length thereof. Tubular member 10 is comprised of an arcuated handle portion 12 which forms an upper end and a ground-engaging portion 13 which comprises a lower end. Ground-engaging portion 13 is adapted to receive a rubber cushion 14 and the extreme end of handle 12 is adapted to receive a protective cap 15 which prevents the hand of the user from engaging the sharp corners of the same. Tubular member 10 is further provided with opening 17 which is positioned adjacent handle 12 and opening 18 which is located near ground-engaging portion 13 thereof. Tubular member 10 is also provided with pivot openings 19 (only one of which is shown).

Trigger 20 is comprised of a U-shaped portion having arms 21 and 22 and a slender hand-receiving tongue portion 23 which connects arms 21 and 22 and which extends outwardly, from the vertex formed thereby. Arms 21 and 22 are respectively provided with holes 24 and 25. Trigger 20 is mounted on tubular member 10 adjacent handle 12 by pin 26. Pin 26 extends through openings 27 and 28 (opening 28 not being shown) in tubular member 10 and receives trigger 20 by extending through holes 24 and 25. Thus, trigger 20 is adapted to pivot longitudinally with respect to the length of tubular member 10.

Grasping arm 30 is shaped like a W and is formed from a continuous length of heavy gauge wire or the like.

Grasping arm 30 includes lobes 31 and 32 which serve as the means for pressing larger objects against end 13 of tubular member 10. The inwardly facing portions of lobes 31 and 32 are provided with hooks 33 and 34, respectively. Flexible member 35, which may be a thick rubber band or the like, is stretched between hooks 33 and 34. Metal clasp 36 is positioned around flexible member 35 and is adapted to engage rubber cushion 14 and in cooperation therewith to pick up small objects. Metal clasp 36 includes a barb 37 which is adapted to penetrate paper and the like to prevent the same from slipping past lobes 31 and 32. Thus, rubber cushion 14 holds the object against a floor surface and barb 37 frictionally engages or penetrates the paper to crumple it toward rubber cushion 14 whereupon flexible member 35 secures the object against rubber cushion 14. Grasping arm 30 is secured to tubular member 10 by means of U-shaped collar 40. U-shaped collar 40 includes legs 41 and 42 which are joined together by curved vertex 43. Legs 41, 42 and vertex 43 are provided with openings 44, 45 and 46, respectively. Pin 47 extends through holes 19 of tubular member 10 and through openings 44 and 45 of U-shaped collar 40 such that U-shaped collar 40 is externally and pivotally mounted on tubular member 10. Extensions 48 and 49 of grasping arm 30 are rigidly secured to the ends of legs 41 and 42, respectively, such that upon the pivotal movement of U-shaped collar 40 about pin 47, grasping arm 30 is moved toward end 13 of tubular member 10. Collar 40 normally positions grasping arm 30 so that it extends toward ground-engaging portion 13 in a diverging relationship therewith.

U-shaped collar 40 and trigger 20 are joined by connecting rod 50 which has a body portion 51 residing in tubular portion 11 of tubular member 10. End 52 of connecting rod 50 extends through opening 17 of tubular member 10 and includes a hook portion 53. Hook portion 53 extends through opening 54 in trigger 20 and adapts connecting rod 50 to move longitudinally upon the inward pivoting movement of trigger 20 and is also adapted to return trigger 20 to a normal static position upon release of the same. Connecting rod 50 further includes end 56 which is comprised of U-shaped body portion 57 and U-shaped end portion 58. U-shaped body portion 57 extends outwardly through opening 18 of tubular member 10 and is received by opening 46 of U-shaped collar 40. U-shaped end 58 is connected to and is supported by tension spring 60 which is connected to stake 61. Stake 61 is rigidly secured in end 13 of tubular member 10.

In operation, the normal static position for the device is characterized by trigger 20 and grasping arm 30 being in an open position and by spring 60 maintaining tension on connecting rod 50. Since tension is maintained at all times on end 56 of connecting rod 50, U-shaped collar 40 is normally held in a downward position and trigger 20 is held in a downward and outward position. Upon an operator grasping handle 12 and trigger 20 and pivoting trigger 20 toward handle 12, connecting rod 50 is moved upwardly with respect to tubular member 10 and pivots U-shaped collar 40 upwardly which in turn moves grasping arm 30 toward end 13 of tubular member 10. If the object to be picked up is small, lobes 31 and 32 of grasping arm 30 are positioned substantially on each side of rubber cushion 14 and flexible member 35 is stretched around a portion of the periphery of the same so that clasp 36 engages rubber cushion 14 and traps any small object therebetween with sufficient force to prevent the particular object from becoming dislodged while end 13 of tubular housing 10 is moved from the ground or equivalent location upwardly and until trigger 20 is released. Upon the release of trigger 20, spring 60 pulls end 56 of connecting rod 50 downwardly thus returning grasping arm 30 and trigger 20 to their normal static positions.

What is claimed is:

1. A composite walking stick and retrieval device for picking up large and small objects comprising:
   (a) an elongated tubular member having a body portion providing a cavity and including a lower ground-engaging end and an upper end curved as a handle;
   (b) a trigger pivotally mounted on said tubular member adjacent said handle end and adapted to pivot toward said handle from a normally open position;
   (c) grasping means pivotally mounted on said tubular member adjacent said ground-engaging end, said grasping means being comprised of a U-shaped collar having the legs thereof pivotally mounted on said tubular member and having a vertex connecting said legs, a W-shaped grasping arm having the free ends thereof rigidly connecting to the free ends of said collar legs, said grasping arm extending laterally from said U-shaped collar in the direction of and divergingly with respect to said ground-engaging end of said tubular member, said grasping arm being adapted to move from a normally open position straddling said ground-engaging end inwardly toward said ground-engaging end and including a flexible means mounted on said grasping arm and adapted to deform around the periphery of said ground-engaging end upon said grasping arm completing its movement inwardly;
   (d) linking means mounted to work in said tubular member cavity and connecting said trigger and grasping means and enabling said grasping means to be pivoted into engaegment with said ground-engaging end by pivotal movement of said trigger toward said handle end; and
   (e) spring means secured to said tubular member and operatively arranged for returning said grasping means and trigger to said normally open positions.

2. The composite walking stick and retrieval device of claim 1 wherein said W-shaped grasping arm is comprised of an integral length of relatively rigid wire the ends of which are rigidly secured to said free ends of said collar legs, said W-shaped wire including two spaced outwardly projecting lobes being adapted to be positioned adjacent respective sides of said tubular member ground-engaging end upon the inward pivoting movement of grasping arm toward said tubular member ground-engaging end.

3. The composite walking stick and retrieval device of claim 2 wherein said flexible means is a thick rubber band being connected to the outward ends of said lobes.

4. The composite walking stick and retrieval device of claim 3 wherein said linking means is an elongated rod having a body portion residing in said tubular member cavity, one end being pivotally connected to said trigger and the other end pivotally connected to said vertex of said collar whereby upon the pivotal movement of said trigger toward said handle end, said elongated rod pivots said collar and said grasping arm to cause contact between said rubber band and said tubular member ground-engaging end.

5. The composite walking stick and retrieval device of claim 4 wherein said tubular member ground-engaging end is provided with a rubber cushion enclosing said end and extending upwardly a distance along the outer periphery of said ground-engaging end to engage said rubber band upon the pivotal movement of said grasping arm toward said ground-engaging end.

6. The composite walking stick and retrieval device of claim 5 wherein said spring means is a tension spring residing in said tubular member cavity and having one end thereof securely attached to said tubular member and wherein said end of said elongated rod being connected to said collar vertex is provided with a hook means for receiving the other end of said tension spring whereby as said trigger is pivoted toward said handle end, said tension spring becomes flexed and is adapted to return said trigger and said grasping arm to a normally static-open position upon the release of said trigger.

7. The composite walking stick and retrieval device of claim 6 wherein said rubber band receives a metal clasp, said metal clasp including an outwardly projecting barb for cooperating with the rubber cushion to secure an object between said ground-engaging end and said grasping end.

References Cited
UNITED STATES PATENTS

| | | | |
|---|---|---|---|
| 1,846,968 | 2/1932 | Kablanow | 294—19 |
| 2,346,038 | 4/1944 | Mason | 294—19 |
| 3,105,715 | 10/1963 | Happ | 294—61 |

ANDRES H. NIELSEN, *Primary Examiner.*